United States Patent
Chin et al.

(10) Patent No.: US 9,311,802 B1
(45) Date of Patent: Apr. 12, 2016

(54) SYSTEMS AND METHODS FOR AVOIDING COLLISIONS WITH MOBILE HAZARDS

(71) Applicant: Elwha, LLC, Bellevue, WA (US)

(72) Inventors: Hon Wah Chin, Palo Alto, CA (US); Roderick A. Hyde, Redmond, WA (US); Jordin T. Kare, Seattle, WA (US); Elizabeth A. Sweeney, Seattle, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 14/516,427

(22) Filed: Oct. 16, 2014

(51) Int. Cl.
  *G08B 23/00* (2006.01)
  *G08B 21/02* (2006.01)
(52) U.S. Cl.
  CPC ..................... *G08B 21/02* (2013.01)
(58) Field of Classification Search
  CPC ..... G01S 17/93; G08B 21/02; H04M 1/0264; H04M 1/0272; G06T 19/006
  USPC .............. 340/573.1, 517, 521, 522, 541, 565, 340/572.1; 345/633
  See application file for complete search history.

(56) References Cited

U.S. PATENT DOCUMENTS

| | | | |
|---|---|---|---|
| 7,702,019 B2 | 4/2010 | Iwasaki et al. | |
| 7,852,217 B2 | 12/2010 | Kondo et al. | |
| 7,862,475 B2 | 1/2011 | Watterson et al. | |
| 8,306,265 B2 | 11/2012 | Fry et al. | |
| 8,330,814 B2 | 12/2012 | Matsuda et al. | |
| 8,365,869 B2 | 2/2013 | Stannah et al. | |
| 8,497,634 B2 | 7/2013 | Scharf | |
| 8,525,874 B2 | 9/2013 | Willmann et al. | |
| 8,953,841 B1* | 2/2015 | Leblang | G06K 9/00671 345/633 |
| 2007/0285510 A1 | 12/2007 | Lipton et al. | |
| 2008/0204258 A1 | 8/2008 | Dayton et al. | |
| 2010/0177968 A1 | 7/2010 | Fry et al. | |
| 2010/0216599 A1 | 8/2010 | Watterson et al. | |
| 2010/0314201 A1 | 12/2010 | Stannah et al. | |
| 2012/0194554 A1* | 8/2012 | Kaino | G08B 13/19621 345/633 |
| 2013/0166198 A1 | 6/2013 | Funk et al. | |
| 2013/0229518 A1 | 9/2013 | Reed et al. | |
| 2013/0232003 A1 | 9/2013 | Yeo | |
| 2013/0293586 A1* | 11/2013 | Kaino | G08G 1/005 345/633 |
| 2013/0332064 A1 | 12/2013 | Funk et al. | |

* cited by examiner

*Primary Examiner* — Toan N Pham

(57) ABSTRACT

A safety system, and associated methods of operation, for detecting a mobile hazard on a pathway and reporting to a user information relating to the object to help the user avoid a collision with the mobile hazard. The safety system includes a sensor system for detecting the concurrent presence of both a user and a mobile hazard within a monitoring zone of the sensor system. Upon detection of both the user and the mobile hazard within the monitoring zone, the sensor system generates a sensor signal. The sensor signal is received by a reporting system, which in response, generates a warning signal to alert the user to the presence of the mobile hazard.

42 Claims, 6 Drawing Sheets

SYSTEMS AND METHODS FOR AVOIDING COLLISIONS WITH MOBILE HAZARDS

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc., applications of the Priority Application(s)).

PRIORITY APPLICATIONS

None.

RELATED APPLICATIONS

If the listings of applications provided herein are inconsistent with the listings provided via an ADS, it is the intent of the Applicants to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

The field of the present disclosure relates generally to safety systems for monitoring a pathway, and in particular, to such safety systems for detecting a mobile hazard on the pathway and reporting to a user information relating to the mobile hazard to help the user avoid a collision with the mobile hazard.

SUMMARY

The present disclosure describes various embodiments for safety systems and methods of use for detecting a mobile hazard on a pathway and reporting to a user information relating to the mobile hazard (such as location of the hazard, movement pattern of the hazard, identification of the hazard, etc.) to help the user avoid a collision with the mobile hazard. For example, in one embodiment, the safety system includes a sensor system configured to monitor a pathway and detect a concurrent presence of a human user and a mobile hazard within a monitoring zone of the sensor system. Upon detecting the concurrent presence of the human user and the mobile hazard, the sensor system may generate a sensor signal and transmit that sensor signal to a reporting system. Upon receiving the sensor signal, the reporting system may generate a warning signal to alert the human user to the presence of the mobile hazard within the monitoring zone.

In some embodiments, the warning signal may be a visual signal that the user may perceive or an audible signal that the user may hear to alert the user to the presence of the mobile hazard. In other embodiments, the mobile hazard may be a pet, such as a cat or a dog, and the warning signal may instead be targeted at scaring the pet so that the pet moves away from the pathway. For example, in such embodiments, the warning signal may be an ultrasonic signal heard by the pet or a vibratory signal felt by the pet. In still other embodiments, the warning signal may be any other suitable signal that may be heard or perceived by the user, and/or a signal that may be heard, perceived, or felt by a pet.

In some embodiments, the safety system may further include a mobile hazard positioning system for monitoring a position of the mobile hazard within the pathway. The mobile hazard positioning system may also monitor a position of the human user within the pathway. In some embodiments, the mobile hazard positioning system may include or more sensors, each sensor located at a position along the pathway and having a corresponding sensor field. Each of the sensors is configured to detect either or both of the mobile hazard when the mobile hazard is located within the sensor field and the human user when the human user is located within the sensor field. The sensors may include any suitable sensor for detecting the presence of a user and/or an object, such as optical sensors, infrared sensors, acoustics sensors, pressure sensors, weight sensors, photocell sensors, and Doppler sensors.

In some embodiments, the safety system may further include a tagging system, where the tagging system includes a tag and a tag reader. The tag may be carried by one or both of the human user and the mobile hazard, and the tag reader may be configured to capture data from the tag to detect the presence of at least one of a human user or a mobile hazard within the pathway. In some embodiments, the tag may contain identification information of the user and/or the mobile hazard carrying the tag. In other embodiments, the tag reader may obtain positioning information of the human user and/or the mobile hazard from the tag.

In some embodiments, the safety system may further include an illumination system in communication with the sensor system, the reporting system, or both. In response to detection of the mobile hazard and the human user in the pathway, the illumination system may be activated to illuminate the pathway to make the mobile hazard easier for the user to locate. In some embodiments, the illumination system may include one or more overhead light sources. In other embodiments, the illumination system may include one or more illumination sources, such as LEDs, adjacent each of the steps of the staircase, where the LEDs are individually illuminated based on the location of the mobile hazard.

In some embodiments, the safety system may be positioned to monitor a staircase having a plurality of steps. In such embodiments, the sensor system may include an activation sensor near one or both of the top step and the bottom step so that the sensor system is activated when the user or the mobile hazard approaches the staircase from either the top or the bottom of the staircase.

Additional details of these and other embodiments are described further below with reference to the accompanying drawings.

DETAILED DESCRIPTION OF EXAMPLE EMBODIMENTS

Figure 1:
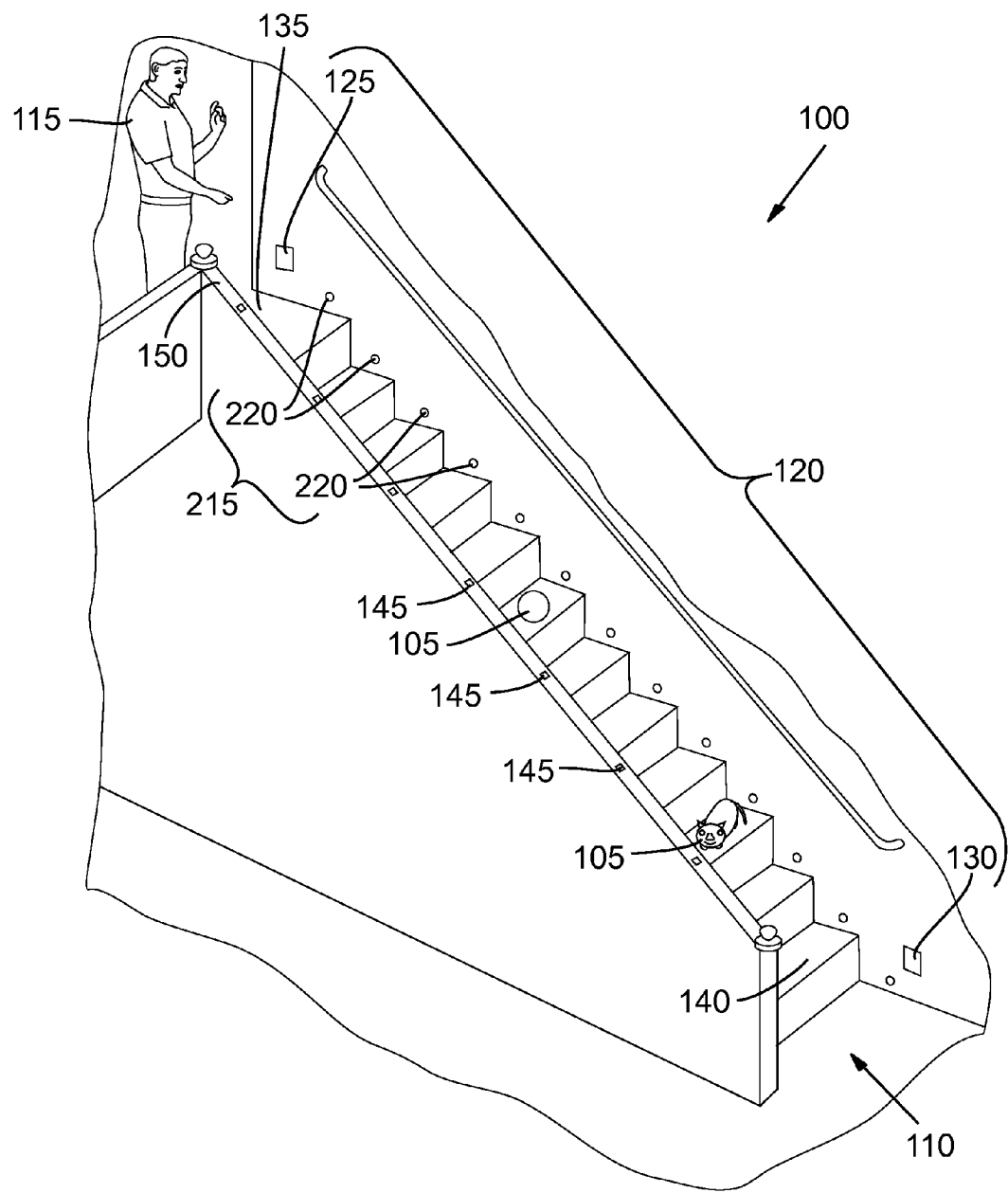
FIG. 1 illustrates a first sensor system monitoring a pathway with animate or moving objects positioned at various locations of the pathway, according to one embodiment.

With reference to the drawings, this section describes particular embodiments of various safety systems and their detailed construction and operation. Throughout the specification, reference to "one embodiment," "an embodiment," or "some embodiments" means that a particular described feature, structure, or characteristic may be included in at least one embodiment of the safety system. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

It should be understood that in the following description, the term "mobile hazard" is used in a general sense to describe any animate object that is capable of moving on its own (e.g., a cat, dog, or other living animal), or any inanimate object that is capable of moving in response to external forces, such as gravity, air flow, etc. (e.g., a rolling ball, a toy, spilled liquid, loose papers) along a pathway. In the following description and the accompanying figures, a cat is typically used as an example of a "mobile hazard." It should be understood that a cat is only one example mobile hazard and not intended to be limiting. In addition, the following description may use the terms "pathway" and "staircase" interchangeably. It should be understood that a staircase is only one example of a pathway that may be used with the safety system described below and is not intended to be limiting.

FIGS. 1-8 collectively illustrate various embodiments of a safety system 100 for detecting an animate object or mobile hazard 105 (e.g., an animal or pet such as a cat or a dog, an inanimate object such as toy or ball moving on the pathway, or other object moving or capable of moving) on a pathway 110, and for reporting information relating to the mobile hazard 105 to a user 115. The mobile hazard 105 may be any animate or inanimate object that may be present on the pathway 110 at any given time. The information reported to the user 115 is aimed at notifying the user 115 about the mobile hazard 105 so that the user 115 may avoid tripping or colliding with the mobile hazard 105 while walking on or along the pathway 110.

With general reference to FIGS. 1-4, the safety system 100 includes a sensor system 120 for detecting the concurrent (or simultaneous) presence of the user 115 and the mobile hazard 105 within a monitoring zone (e.g., on the pathway 110) of the sensor system 120. When both the user 115 and the mobile hazard 105 are positioned within the pathway 110 and detected, the sensor system 120 generates a signal to communicate the concurrent presence of the user 115 and the hazard 105 to a reporting system 180. The reporting system 180 receives the sensor signal and in turn generates a warning signal to alert the user 115 to the concurrent presence of the mobile hazard 105 within the monitoring zone (e.g., the pathway 110). In some embodiments, the reporting system 180 may communicate information relating to the mobile hazard 105, such as the location of the mobile hazard 105, an identification of the mobile hazard 105, and/or a movement pattern of the mobile hazard 105 within the pathway 110. Upon being alerted that the mobile hazard 105 is on the pathway 110, the user 115 may approach the pathway with care to avoid possible injury or causing accidental damage to the mobile hazard 105. It should be understood that while the pathway 110 is illustrated as a staircase in the figures, a staircase is only one example of a pathway 110 and not intended to be limiting. In other embodiments, the pathway 110 may be a ramp, a hallway, a walkway, or any other suitable pathway. The following section describes additional details of these and other embodiments of the safety system 100.

With particular reference to FIG. 1, the sensor system 120 includes a first sensor subsystem 125 and a second sensor subsystem 130 for detecting the presence of the user 115 near or within the pathway 110, which preferably spans between the first and second sensor subsystems 125, 130. The first and second sensor subsystems 125, 130 may each comprise one or more individual sensors. In some embodiments, the sensor subsystems 125, 130 may be positioned at or near an entry and exit end of the pathway 110 to detect the user's 115 approach from either side of the pathway 110. For example, the first sensor subsystem 125 may be positioned proximal to the top step 135 (or initial step/entry portion) of the pathway 110 (e.g., staircase), and the second sensor subsystem 130 may be positioned proximal to the bottom step 140 (or final step/exit portion) of the pathway 110. The first and second sensor subsystems 125, 130 may each have activation fields that overlap the top step 135 and bottom step 140, respectively, to detect the user 115 and the mobile hazard 105 as each approaches or enters the pathway 110 from either the top or the bottom.

Any one of a variety of sensors capable of detecting the presence of the user 115 and the mobile hazard 105 may be suitable for use with the sensor system 120. In other embodiments, the sensors in each of the first and second sensor subsystems 125, 130 may include any of the following: optical sensors, acoustic sensors, infrared sensors, photocell sensors, ultrasonic sensors, radar sensors, proximity sensors, pressure sensors/plates, weight sensors, motion sensors, Doppler sensors, or any other active or passive sensors. In some embodiments, the sensor system 120 may include an RFID sensor configured to detect an RFID tag carried or otherwise worn by the user 115.

In some embodiments, the sensor system 120 may also include additional sensors 145 positioned along the pathway or staircase 110, such as attached to various points on the handrail 150 or positioned near a wall adjacent individual stairs of the staircase, where the additional sensors 145 are configured to monitor the movement of the user 115 and/or the mobile hazard 105 through the pathway (staircase) 110 and determine positional information of the user 115 relative to the pathway (staircase) 110 and/or relative to the mobile hazard 105. Similar to the sensors of the sensor system 120, the sensors 145 may include any of the following: optical sensors, acoustic sensors, infrared sensors, photocell sensors, ultrasonic sensors, radar sensors, proximity sensors, pressure sensors/plates, weight sensors, motion sensors, Doppler sensors, or any other active or passive sensors.

In some embodiments, one or both of the first and second sensor subsystems 125, 130 may also be supported by the handrail 150. In such embodiments, the user 115 may activate the sensor system 120 by contacting the handrail 150, and deactivate the sensor system 120 by releasing contact of the handrail 150. In other words, when the user 115 is walking on the pathway 110, the user 115 may hold the handrail 150, which indicates to the sensor system 120 that the user 115 is present in the pathway 110. Once the user 115 has traveled across the pathway 110, the user releases contact with the handrail 150, indicating to the sensor system 120 that the user 115 is no longer on the pathway 110.

In other embodiments, the sensor system 120 may be in communication with smart apparel (e.g., apparel in communication with the sensors of the first sensor system) worn by the user 115 to detect the presence of the user 115 within the staircase 110, and also detect movement and position information of the user 115. In still other embodiments, the sensor system 120 may be in communication with an electronic device (not shown), such as a mobile phone, personal data assistant (PDA), an electromagnetic transmitter, an ultrasonic transmitter, or other suitable device, carried by the user 115. The electronic device may include a position determination system, such as a GPS or environmental tracking system, configured to generate position information and communicate the information to the first sensor system 120. With this information, the first sensor system 120 may be able to detect the user 115 and track movement of the user 115 through the pathway 110. As is further described in detail with respect to the reporting system 180, motion and positional information may be communicated to the reporting system 180 to assess a likelihood of a collision in real-time and determine whether to provide additional or different warnings to the user 115.

Figure 2:
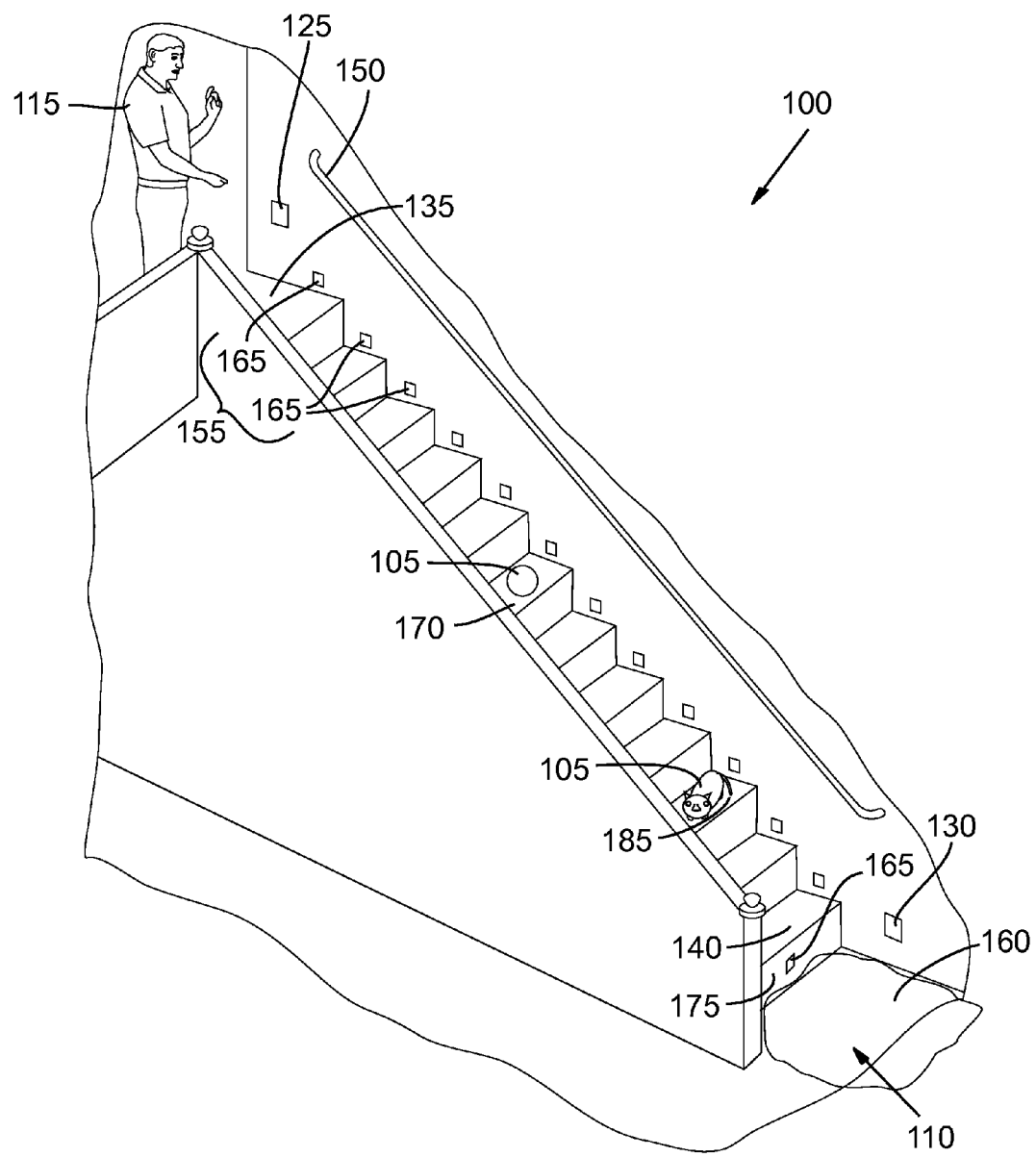
FIG. 2 shows the pathway of FIG. 1 and illustrates a second sensor system for monitoring a pathway with animate or moving objects positioned at various locations of the pathway.

As mentioned previously, the safety system 100 further includes a mobile hazard positioning system 155 for detecting a mobile hazard 105 and monitoring a position and movement of the mobile hazard 105 within the pathway 110 (see FIG. 2). The mobile hazard positioning system 155 may also monitor a position and movement of the human user 115 within the pathway 110 (e.g., after the human user 115 has passed by the first or second sensor subsystem 125, 130). In some embodiments, the mobile hazard positioning system 155 may monitor a position and movement of the human user 115 relative to the position and movement of the mobile hazard 105 or vice versa, and communicate the information to the reporting system 180 (as is further described in detail below).

With reference to FIG. 2, the mobile hazard positioning system 155 may include or more sensors 165, each sensor located at a position along the pathway 110 and having a corresponding sensor field. Each of the sensors 165 is configured to detect either or both of the mobile hazard 105 when the mobile hazard 105 is located within the sensor field and the human user 115 when the human user 115 is located within the sensor field of one or more of the sensors 165. The sensors 165 may be positioned in various configurations along the pathway 110. In one example arrangement, the sensors 165 may each be positioned adjacent an individual step of the staircase 110 and configured to individually monitor the corresponding step. For example, with reference to FIG. 2, the sensors 165 may detect the mobile hazard 105 when positioned proximate the top step 135, the bottom step 140, or any other step (e.g., the mobile hazard 105 is shown on step 170) of the staircase. In some embodiments, the sensors 165 may instead be positioned on the risers 175 between the individual steps of the staircase. In other embodiments, the sensors 165 may be positioned on both the risers 175 and adjacent the steps. In still other embodiments, the mobile hazard positioning system 155 may include only a single overhead sensor or camera (not shown) with a field of view facing downwardly over the pathway 110 to monitor the entire pathway 110. It will be understood by those with skill in the art that other suitable configurations not specifically described herein may be possible.

Any one of a variety of sensors capable of detecting the mobile hazard 105 and the human user 115, and obtaining positioning and/or movement information relating to the mobile hazard 105 and the user 115 may be suitable for use with the mobile hazard positioning system 155. For example, the sensors 165 may include any of the following: optical sensors, acoustic sensors, infrared sensors, photocell sensors, ultrasonic sensors, radar sensors, proximity sensors, pressure sensors/plates, weight sensors, Doppler sensors, motion sensors, or any other active or passive sensors. In some embodiments, the mobile hazard positioning system 155 may include an RFID sensor configured to detect an RFID tag carried or otherwise attached to the mobile hazard 105 (e.g., attached to or embedded in a pet's collar) and/or the user 115. In other embodiments, the mobile hazard 105 and/or the user 115 may include a transmitter device and/or a positioning determination system attached thereto or carried thereby, and the mobile hazard positioning system 155 may include at least one sensor configured to receive a signal (e.g., an electromagnetic or ultrasonic signal) emitted by the transmitter device, or to receive positioning information from the positioning determination system, to track the position and movement of the mobile hazard 105 and the user 115.

Figure 3:
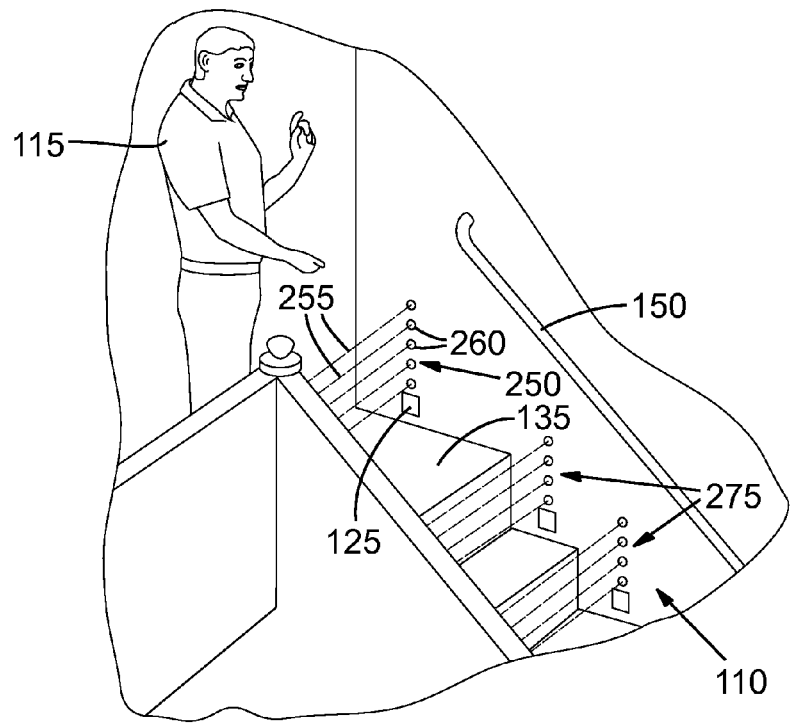
FIG. 3 is a partial cut-away view of the pathway illustrating another embodiment of the first sensor system of FIG. 1.

In one embodiment, one or both of the sensor system 120 and the mobile hazard positioning system 155 may include one or more light curtains 250, 275 for monitoring the pathway 110 and detecting the concurrent presence of the human user 115 and the mobile hazard 105 within the pathway 110. FIG. 3 illustrates an example light curtain 250 on the top step 135 of the pathway 110, as well as additional light curtains 275 on individual steps of the pathway 110. It should be understood that the light curtains 250, 275 may be arranged on each step of the pathway 110, so that each step has a corresponding light curtain. With particular reference to FIG. 3, the light curtains 250, 275 each comprise one or more transmitters 260 and receivers (such as photoelectric cells), each of the transmitters 260 projecting one or more light beams 255 toward the receivers (not shown) so that the light beams 255 travel across a width of the pathway 110. Preferably, the light beams 255 are infrared light beams so that they are not visible to the user 115 for aesthetic purposes, but may be other types of light beams. In some embodiments, the light curtains 250, 275 may further include one or more reflectors (not shown) configured to reflect light from one of the transmitters to one or more of the receivers. When the light curtains 250, 275 are triggered (e.g., a user 115 or mobile hazard 105 traverses one or more light beams 255), the sensor system 120 (or the mobile hazard positioning system 155) generates a sensor signal in response to both the human user 115 and the mobile hazard 105 each triggering any one of the light curtains 250, 275. Additional details of these and other embodiments are discussed below.

In some embodiments, the light curtains 250, 275 are capable of distinguishing between a human user 115 and a mobile hazard 105 by arranging the light beams 255 at different heights above the pathway 110 and monitoring the light beams 255 that are traversed or interrupted. For example, in one embodiment, the light beams 255 of the light curtain 250, 275 may be arranged so that the topmost light beam 255 is at a height of at least two to three feet and up to eight feet or more above the surface level of the pathway 110 (e.g., as measured from a top surface of the corresponding step). In such embodiments, it is highly likely that when the topmost light beam 255 is interrupted, it signals that a human user 115 is moving in the pathway since most mobile hazards 105 (e.g., a cat, a dog, a toy, etc.) are not tall enough to interrupt the topmost light beam 255 if it is set at two or three feet. In other embodiments, the topmost light beam 255 may be set at a height of at least three to four feet or higher to minimize the risk that a dog (or a dog's tail) may interrupt the topmost light beam 255. In addition, by tracking and monitoring the interruption of light beams of successive light curtains 250, 275 positioned throughout the pathway 110, the sensor system 100 may determine a position, a direction of motion, and a speed of motion of the human user 115 and the mobile hazard 105 on the pathway 110.

The following section briefly describes an example operation process using the light curtains 250, 275. In one example, the sensor system 120 and/or the mobile hazard monitoring system 155 monitor the various light beams 255. When the topmost light beam 255 of the light curtain 250 on the top step 135 is triggered, this indicates that a human user 115 has entered the pathway 110 (e.g., a user 115 is going down the stairs). If no other light beams 255 for any of the light curtains 250, 275 are triggered before the user 115 triggers the topmost light beam 255 on the bottom step 140, then no signal is sent to the reporting system 180 because the user 115 has left the pathway 110 and no mobile hazard 105 was detected by any of the light curtains 250, 275 while the user 115 was on the pathway 110. However, if a cat 105 enters the pathway from the bottom step 140 (or the cat 105 was already sitting on the pathway 110 when the user 115 entered the stairs), the cat 105 will interrupt one or more beams 255 of the light curtains 250, 275, but will not interrupt the top most light beam 255. In this situation, one of the light curtains 250, 275 registers the presence of a human user 115 (e.g., the topmost light beam is interrupted) and another of the light curtains 250, 275 registers the concurrent presence of the mobile hazard or cat 105 (e.g., some of the light beams of another light curtain are interrupted). At this point, a signal from one or both of the sensor system 120 and the mobile hazard positioning system 155 is sent to the reporting system 180 to alert the user of the concurrent presence of the mobile hazard 105 so as to avoid a possible collision on the pathway 110.

Preferably, the sensor field of the mobile hazard positioning system 155 is sufficiently large to monitor the entirety of the pathway 110 to ensure that both the human user 115 and the mobile hazard 105 are detected when concurrently present in the pathway 110. In some embodiments, the mobile hazard positioning system 155 may also monitor a region 160 extending outside or beyond the pathway 110. For example, for the staircase 110 illustrated in FIG. 2, the sensor field of the mobile hazard positioning system 155 preferably includes the top step 135, the bottom step 140, the plurality of steps therebetween (not numbered for clarity), and a region after the bottom step (or exit portion) 160 and a similar region (not numbered) in front of the top step (or entry portion) 135. This expansive sensor field allows the mobile hazard positioning system 155 not only to detect a mobile hazard 105 and a human user 115 within the pathway 110, but also to detect each as it approaches the staircase or is near the staircase but has not yet cross the threshold into the staircase.

Upon detecting the concurrent presence of the mobile hazard 105 and the human user 115, the mobile hazard positioning system 155 obtains information relating to the mobile hazard 105 and the human user 115. The mobile hazard positioning system 155 may obtain or determine a location or position information of both the mobile hazard 105 and the human user 115 on the pathway. For example, the mobile hazard positioning system 155 may identify a step at which the mobile hazard 105 and/or the human user 115 is located, may identify the location of the mobile hazard 105 relative to the user 115 (such as identifying whether the mobile hazard 105 is located at a step above or below the human user 115 on the staircase), or may identify a number of steps separating the human user 115 and the mobile hazard 105 on the pathway 110. In other embodiments, the mobile hazard positioning system 155 may obtain other location or position information, such as the movement speeds of the mobile hazard 105 and the user 115, the direction of motion of the mobile hazard 105 and the user 115 (e.g., the mobile hazard 105 and the user 115 are moving down the stairs, up the stairs, or headed toward each other), identification information of the mobile hazard 105 (including dimensional information of the mobile hazard 105, such as height and length), or other information. As described in further detail below, mobile hazard positioning system 155 generates an object signal to communicate the information to the reporting system 180.

Preferably, the mobile hazard positioning system 155 is configured to detect the simultaneous presence of a plurality of mobile hazards 105 on the pathway 110 and generate the object signal, which includes position, movement and/or other information for each of the mobile hazards 105. For example, with reference to FIG. 2, the mobile hazard positioning system 155 may determine that there is a cat 105 on the third step 185 of the staircase, and a rolling ball 105 near a middle step 170 of the staircase. In this scenario, the mobile hazard positioning system 155 may identify each of these mobile hazards 105, and identify a location, movement speed, and movement direction for each of the mobile hazards 105. This information relating to the mobile hazard(s) 105 is thereafter communicated to the reporting system 180 (see FIG. 4) to alert the user of the presence of the multiple mobile hazards 105 on the pathway 110. Further details of the reporting system 180 are described below with particular reference to FIG. 4.

Although the sensor system 120 and the mobile hazard positioning system 155 have been described as individual, standalone systems, these systems 120, 155 may share various components (e.g., the sensors) and/or the systems 120, 155 may each be subsystems of a larger, integrated sensor system with shared components. In such embodiments, the systems 120, 155 may operate as independent subsystems (as described earlier) or may cooperate with one another. For example, in one embodiment, when the sensor system 120 detects the concurrent presence of the user 115 and the mobile hazard 105 within its activation field, the sensor system 120 sends an activation or wake-up signal to activate the mobile hazard positioning system 155. Once activated, the mobile hazard positioning system 155 locates the mobile hazard 105 and the user 115 the pathway 110 and obtains the positioning and movement information as described previously.

In other embodiments, the mobile hazard positioning system 155 may instead generate the activation or wake-up signal upon detection of the mobile hazard 105 in the pathway. In response to receiving the activation signal, the sensor system 120 may thereafter determine whether a user 115 is present near or adjacent the pathway 110. In still another embodiment, the safety system 100 may include a separate controller (not shown) which is in communication with the systems 120, 155. In response to activation of either system 120, 155, a bit is set in the controller to indicate that one system has been activated. Periodically, the non-activated system can check the status of the bit, and wake up if the bit is set.

Figure 4:
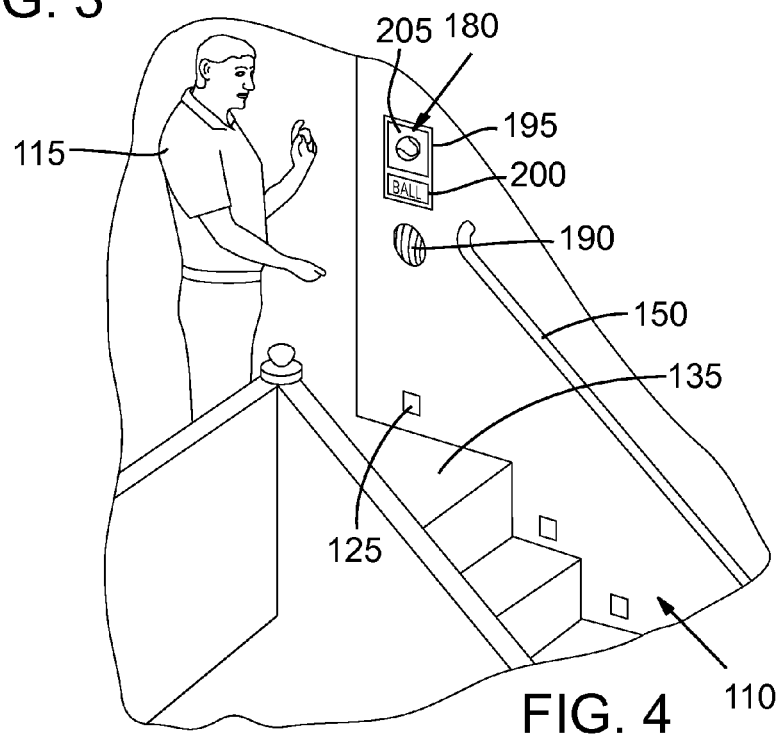
FIG. 4 is a partial cut-away view of the pathway illustrating a reporting system for communicating information to the user relating to the object on the pathway.

As mentioned previously, in response to detecting the mobile hazard 105 within the sensor field, one or both of the sensor system 120 and the mobile hazard positioning system 155 (alone or in combination with one another) obtains object information, such as position information, relating to the mobile hazard 105 and the user 115, and generates a sensor signal based on the object information to communicate the position or other information of the user 115 and/or the mobile hazard 105 to a reporting system 180 (see FIG. 4). The reporting system 180 receives the sensor signal and generates a warning signal to alert the user 115 to the concurrent presence of the mobile hazard 105 in the pathway 110.

In some embodiments, the reporting system 180 accounts for the proximity of the user 115 relative to the mobile hazard 105 in determining whether to generate the warning signal (as is further described below in detail with reference to FIG. 4). For example, if the mobile hazard 105 appears at the top step 135 of the staircase after the user 115 has already passed that point (e.g., the user is walking down the stairs and is near the middle of the staircase), the reporting system 180 may not generate any warning signal since the mobile hazard 105 no longer poses any danger to the user 115. However, if the user 115 turns around and begins walking up the stairs, the sensor system 120 and/or the mobile hazard positioning system 155 detect the change of direction and the reporting system 180 may then generate the warning signal since the user 115 is now headed toward the mobile hazard 105.

In some embodiments, the reporting system 180 accounts for the position and/or motion of the mobile hazard 105 relative to the user 115 in determining whether to generate the warning signal. For example, if the mobile hazard 105 appears at the top step 135 of the staircase 110 after the user 115 has already passed that point (e.g., the user is walking down the stairs and is near the middle of the staircase), the reporting system 180 may nonetheless generate a warning signal if the sensor system 120 detects that the mobile hazard 105 (e.g., a cat or a ball) is moving down the stairs at a high enough rate of speed relative to user 115 so that it is predicted to reach user 115 while user 115 is still on the staircase. In some embodiments, the reporting system 180 may base the generation of a warning signal on the direction in which user 115 is facing, e.g., always generate a warning signal when user 115 is facing away from an approaching mobile hazard 105, but not always do so when user 115 is facing towards mobile hazard 105. The direction in which user 115 is facing may be determined directly (e.g., by a camera in sensor system 120) or indirectly (e.g., inferred from the direction of motion of user 115). In some embodiments, the reporting system 180 may base the generation of a warning signal on ambient lighting. For example, the reporting system may always generate a warning signal in low light conditions, but may not always do so in well-lit conditions. The following section describes additional information relating to the reporting system 180.

FIG. 4 is a partial cut-away view of the pathway 110 illustrating an example reporting system 180 positioned adjacent the top step 135 of the pathway 110 for communicating information to the user 115 relating to the mobile hazard 105. As described previously, the reporting system 180 may deliver the warning signal in any number of suitable methods, which in some embodiments, may depend on the object information related to the mobile hazard 105. For example, in some embodiments, such as where the mobile hazard 105 is an inanimate object, the warning signal may include an audible signal, such as an alarm, a spoken message (e.g., a command to stop, a command to stay left or right, or any other command), or other signal heard by the user delivered through a speaker system 190. The warning signal may additionally, or alternatively include, a visual signal perceived by the user 115. The visual signal may be presented to the user 115 on a display screen 195 and may include the object information 200 obtained from the mobile hazard 105 (such as identity of the mobile hazard 105, location of the mobile hazard 105, etc.), an image 205 of the mobile hazard 105, or any other graphic image or textual message. With reference to FIG. 4, the display screen 195 may mounted near the top step 135 of the pathway (or staircase) 110 for easy reference or viewing by the user 115. Since injury may be more likely and/or more severe if one were to fall going down the stairs rather than fall while walking up the stairs, it is preferable that the reporting system 180 (and in particular the display screen 195) is positioned near the top step 135 of the pathway (or staircase) 110. In other embodiments, the reporting system 180 may be positioned both at the top step 135 and the bottom step 140 of the pathway 110. In still other embodiments, the display screen 195, or a second display screen (not shown), may be positioned near the bottom of the pathway 110, and/or at any other convenient point along the pathway 110.

Figure 5:
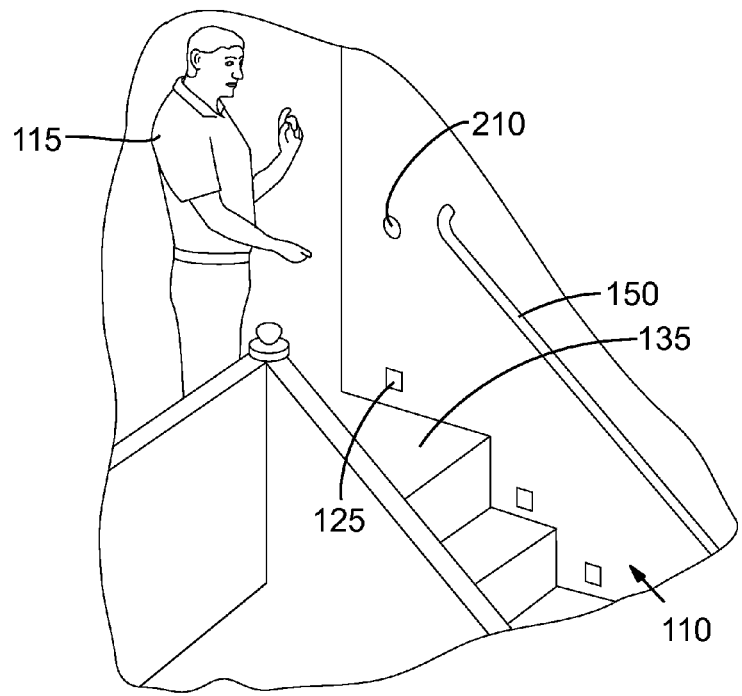
FIG. 5 is a partial cut-away view of the pathway illustrating a reporting system according to another embodiment.

In other embodiments, the visual signal may simply be a light source that indicates to the user whether a mobile hazard 105 is present on the pathway 110 or not. FIG. 5 illustrates an alternate embodiment of the reporting system 180. With reference to FIG. 4, a light-emitting diodes (LED) 210 or other light source may be mounted adjacent both a first end (e.g., the top step 135 of the staircase) and a second end (e.g., the bottom step 140 of the staircase) of the pathway 110 (or any other location along the pathway 110). When no mobile hazard 105 is detected on the pathway 110, the LED 210 on the top step 135 and the bottom 140 (not shown) may be green, indicating that the pathway 110 is free of mobile hazards 105. When a mobile hazard 105 is detected on the pathway 110, the LED 210 may switch from green to red to warn the user 115 that a mobile hazard 105 has been detected on the pathway 110. As the user 115 approaches the pathway 110, the user may first check the status of the LED 210 to determine whether the pathway 110 is safe to walk on or whether the user 115 should be searching for the location of the mobile hazard 105 on the pathway 110.

In some embodiments, the reporting system 180 may include an output device (not shown), such as a small radio, a mobile phone, or other electronic device, that is carried or worn by the user 115 and is in wireless communication with the reporting system 180. In such embodiments, the audible signal may be communicated from the reporting system 180 through the output device so that the user 115 can hear the signal. In some instances, the warning signal may include a vibratory signal where the output device (e.g., a mobile phone) vibrates so that the user 115 can feel it. Once the user 115 feels the vibration, the user 115 may check his or her mobile phone to determine whether the reporting system 180 is sending a warning signal alerting the user 115 of the concurrent presence of the mobile hazard 105 in the pathway 110.

In other embodiments, the reporting system 180 may alternatively (or additionally) generate the warning signal to urge movement of the mobile hazard 105 away from the pathway 110. For example, in instances when the mobile hazard 105 is an animal, such as a cat or a dog, or other animate object moving along the pathway 110, the warning signal may include a visual signal perceived by the mobile hazard 105 (such as a laser point aimed off the pathway to urge the cat, dog, or other animal to chase), an audible or ultrasonic signal heard by the mobile hazard 105 to urge movement off the pathway 110, or a vibratory signal felt by the mobile hazard 105. In some embodiments, the reporting system 180 may include various output or electronic devices positioned at various points along the pathway 110 to deliver the warning signal depending on a position of the mobile hazard 105. For example, the warning signal may be delivered by the output or electronic device that is closest to the mobile hazard 105 to increase the likely effectiveness of the warning signal.

In other embodiments, an electronic output device (not shown) in wireless communication with the reporting system 180 may be attached to a collar of the cat or dog and configured to deliver a vibratory signal when the mobile hazard 105 is on the pathway 110 concurrently with a human user 115, so that the cat or dog may be urged to run away. In other embodiments, the warning signal delivered to the output device attached to the animal may include at least one of a visual signal perceived by the animal, an audible signal heard by the animal, an ultrasonic signal heard by the animal, or a vibratory signal felt by the animal. In still other embodiments, the warning signal delivered to the output device attached to the animal may also include an audible signal heard by the user 115 or a visual signal perceived by the user 115 so that the user 115 is aware that a cat or dog may be moving on the pathway 110.

As mentioned previously, one or both of the mobile hazard positioning system 155 and/or the sensor system 120, alone or in combination with one another, may be configured to detect a particular location of the mobile hazard 105 and the user 115 on the pathway 110 (such as on any individual step of the staircase). In such embodiments, the object signal generated by the sensor system 120 and/or the mobile hazard positioning system 155 includes object information pertaining to the position information of the mobile hazard 105 (e.g., the step where the mobile hazard 105 is located). When the reporting system 180 receives the object signal, the reporting system 180 communicates to the user 115, such as via the display screen 195, the position information related to a relative position of the user 115 and the mobile hazard 105.

For example, in one embodiment, the display screen 195 communicates to the user 115 the step at which the mobile hazard 105 is located so that the user 115 can quickly locate the mobile hazard 105. As described previously, the display screen 195 may present an image and textual description of the mobile hazard 105 to the user 115, along with the location information so that the user 115 can quickly identify the mobile hazard 105 and its precise location. The reporting system 180 may further communicate whether the step at which the mobile hazard 105 is located is above or below (or forward or aft) the current position of the user 115, or may indicate the number of steps separating the user 115 from the mobile hazard 105 on the staircase.

In some embodiments, the reporting system 180 may be configured to communicate to the user 115 position information related to the position of the mobile hazard 105 relative to a direction of motion of the human user 115. For example, the reporting system 180 may alert the user whether the mobile hazard 105 is behind or in front of the user 115 on the pathway or staircase 110 based on the detected direction of motion of the user 115 (e.g., walking up the stairs or down the stairs). In other embodiments, the reporting system 180 may further communicate to the user the direction of motion of the mobile hazard 105 relative to the user 115 (e.g., whether the mobile hazard 105 is moving toward or away from the user 115).

With reference to FIG. 1, the safety system 100 may include an illumination system 215 positioned adjacent (or above) the pathway 110. Preferably, the illumination system 215 is in communication with one or both of the sensor system 120 and the mobile hazard positioning system 155, and the reporting system 180. When the user 115 and the mobile hazard 105 are both detected on the pathway 110 at the same time, the illumination system 215 is activated to illuminate a portion, or the entirety of, the pathway 110 to aid the user 115 in locating the mobile hazard 105 on the pathway 110. In some embodiments, the illumination system 215 may include a plurality of individual light sources (such as light emitting diodes or LEDs) 220, where each of the light sources 220 is configured to illuminate a predetermined section of the pathway 110. In such embodiments, a single illumination source 220 is attached or mounted adjacent a corresponding step of the pathway (or staircase) 110 so that each step of the pathway 110 includes an individual illumination source 220. In this arrangement, the illumination system 215 is capable of individually illuminating each of a plurality of mobile hazards 105 on the pathway 110.

For example, with reference to FIG. 1, the illumination source 220 may illuminate sections of the pathway 110 proximal to a position of the mobile hazard 105 (which may be determined by the mobile hazard positioning system 155 as described previously). When the mobile hazard 105 is detected in the pathway 110, the reporting system 180, the illumination system 215 (or other system) illuminates or activates the illumination source 220 to illuminate the mobile hazard 105 on the step, while the remaining illumination sources 220 remain in the off position. In such embodiments, the illumination system 215 communicates to the user 115 the step at which the mobile hazard 105 is located.

In some embodiments, movement of the mobile hazard 105 may be tracked in real-time by the illumination system 215, where individual illumination sources 220 are activated as the mobile hazard 105 moves through the pathway 110. For example, when the mobile hazard 105 leaves one step, the corresponding illumination source 220 for that step may be turned off, and the illumination source 220 for an adjoining step to which the mobile hazard 105 has moved to may be activated.

In other embodiments, the illumination system 215 may include one or more indicators, for example a color indicator, to provide to the user 115 information regarding a movement status of the mobile hazard 105. For example, when a mobile hazard 105 is detected on the pathway 110 and is determined to be stationary, the corresponding illumination source 220 is activated to illuminate the mobile hazard 105 with red light to indicate to the user 115 that the mobile hazard 105 is stationary. When the mobile hazard 105 is detected on the pathway 110 and determined to be moving away from the user, the corresponding illumination source 220 is activated to illuminate the mobile hazard 105 with a green light. The green light may indicate to the user 115 that the mobile hazard 105 is not currently a hazard since it is moving away from the user 115. Finally, when the mobile hazard 105 is detected on the pathway 110 and determined to be moving toward the user 115, the corresponding illumination source 220 is activated to illuminate the mobile hazard 105 with a yellow light. The yellow light may indicate to the user 115 to use caution since the mobile hazard 105 is moving toward the user 115 and may present an imminent hazard.

In another embodiment, the reporting system 180 is capable of tracking the mobile hazard 105 as the mobile hazard 105 moves through the pathway 110 so that the user 115 may be aware of the mobile hazard's 105 movement and location. For example, the reporting system 180 may include one or more output devices, such as a plurality of speakers along the pathway 110 that produce sound near the mobile hazard 105. As the mobile hazard 105 moves, speakers corresponding to the location nearest the mobile hazard 105 are activated to track the mobile hazard 105. In other embodiments, a single speaker able to project sound may be used to track the mobile hazard 105.

In other embodiments, the reporting system 180 may include one or more indicators, such as a color indicator or a speaker, to provide information regarding the mobile hazard 105 to the user 115. For example, when a mobile hazard 105 is detected on the pathway 110 and is determined to be stationary, the speaker(s) of the reporting system 180 are activated to produce an indicator sound of predetermined intensity. When the mobile hazard 105 is detected in the pathway 110 and determined to be moving away from the user 115, the speaker(s) of the reporting system 180 are activated to produce an indicator sound of decreasing intensity or volume to indicate the mobile hazard 105 is moving away from the user 115. If the mobile hazard 105 is moving toward the user 115, the speakers may produce an indicator sound of increasing intensity or volume. If the mobile hazard 105 is stationary, the speakers may produce an indicator sound of constant intensity or volume.

Figure 6:
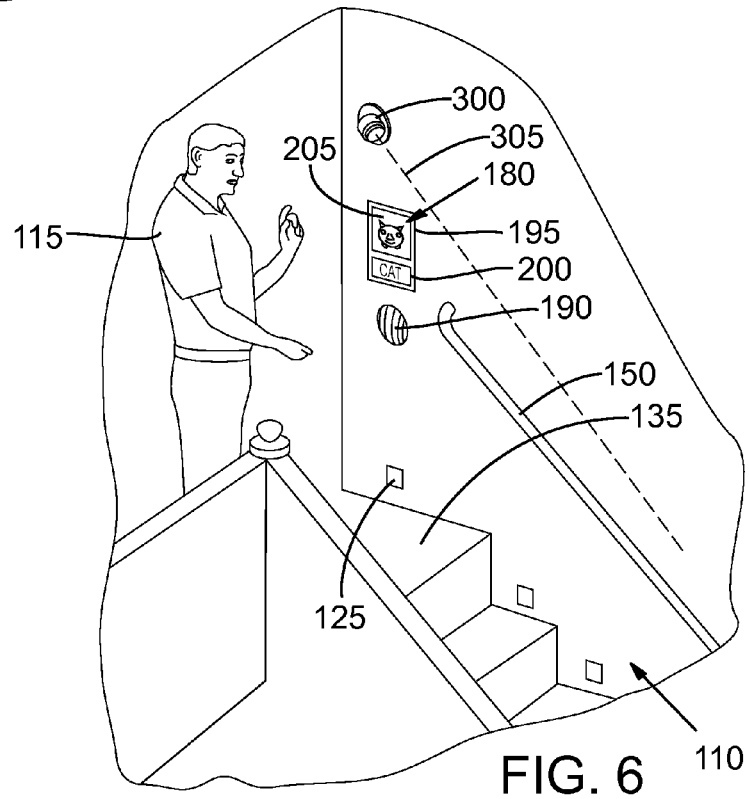
FIG. 6 is a partial cut-away view of the pathway illustrating a camera system according to one embodiment.

FIG. 6 is a cut-away view illustrating a camera system 300 having a field of view 305 overlapping the pathway 110. The camera system 300 is capable of detecting movement of the moving hazard 105 (and/or the human user 115) within the pathway 110. Upon detecting movement, the camera system 300 captures one or more images of the moving hazard 105. The images are thereafter processed via an image processor (not shown) that may be integrated with the camera system 300 or may be part of a remote system (such as a computer) that is in communication with the camera 300. The image processor processes the images and identifies the moving hazard 105 based on the captured images.

In some embodiments, the camera system 300 may include a database having stored images of a known moving hazard 105. For example, the database may include images of all animals that live in the house or building containing the pathway 110. The database may also include images of other possible hazards that may be positioned in the pathway 110, such as particular toys, balls, boxes, skateboards, roller skates, etc. In such embodiments, the image processor may compare the captured images with the stored images in the database to identify the mobile hazard 105. Upon identifying the mobile hazard 105, the camera system 300 communicates the information relating to the mobile hazard 105 to the reporting system 180. The reporting system 180 then communicates the information to the user 115 in any manner as described previously, such as by presenting an image 205 of the mobile hazard 105 to the user 115 via the display 195.

As mentioned previously, the camera system 300 may also obtain images of the user 115 to identify the user 115 in a similar process as described above with relation to identifying the mobile hazard 105. The camera system 300 may compare the obtained images of the user 115 with those stored in a database to identify the user 115.

Although the camera system 300 is illustrated in FIG. 6 adjacent the top step 135 of the staircase 110 with a field of view 305 facing generally down the staircase 110, the camera system 300 may include a second camera (not shown) near the bottom step 140 of the staircase 110 (see FIG. 1) having a field of view facing generally up the staircase 110 to ensure that the camera system 300 adequately monitors the entire staircase 110.

In other embodiments, the camera system 300 may instead be a radar system (not shown). Similar to the camera system 300, the radar system may have a field of view overlapping the pathway 110 and comprise at least one of the following: micro-impulse radar, a physically scanned radar, a continuous wave radar, a pulsed radar, a moving target indicator radar, a pulse Doppler radar, a frequency modulated radar, or a phased array radar. The radar system detects movement of the human user 115 and/or the moving hazard 105 within the pathway 110 and obtains images of the user 115 and/or the moving hazard 105. The images may be compared to a stored database of images to identify the user 115 or the moving hazard 105 in a similar fashion as described previously. In some embodiments, the radar system may further determine a size and shape of the moving hazard 105 from the images. In other embodiments, the radar system may determine at least one of a pulse rate or a respiration rate of the moving hazard (animal) 105 from two or more of the images to determine the activity level of the moving hazard 105 on the pathway 110, such as whether the animal is moving, sleeping, sitting still, etc. The information, including images obtained by the radar system, may be presented to the user via the reporting system 180 as described with respect to FIG. 6.

Figure 7:
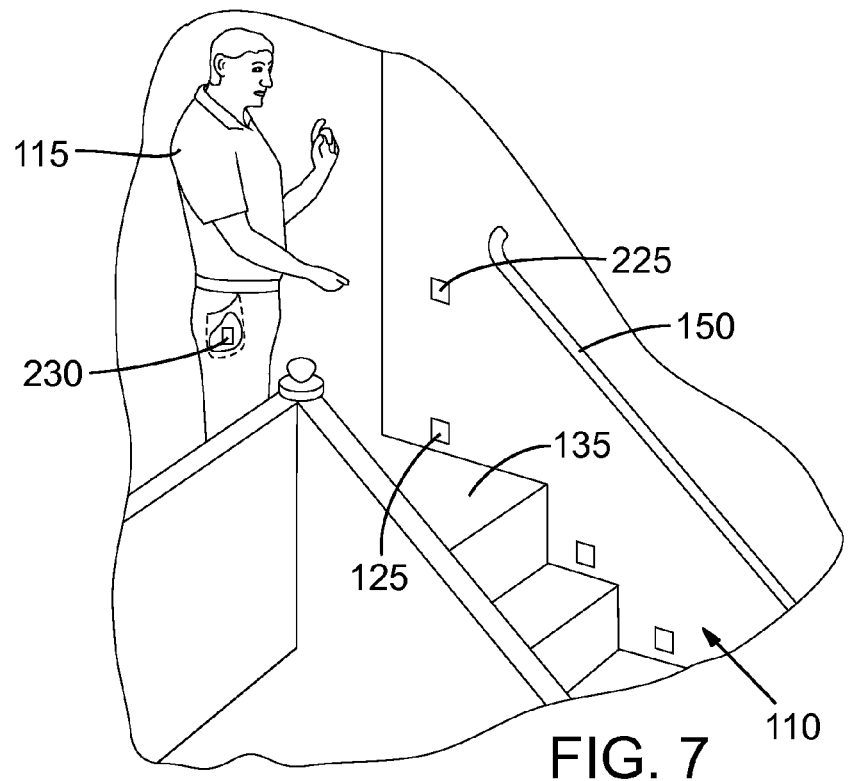
FIG. 7 is a partial cut-away view of the pathway illustrating a tagging system according to one embodiment.

FIG. 7 is a cut-away view illustrating a tagging system including a tag reader 225 and a tag 230. In some embodiments, the tagging system may be incorporated into or may be in communication with the sensor system 120. With reference to FIG. 7, the tag 230 may be carried by the user 115 (such as in a pants pocket, shirt pocket, or embedded in an electronic device, such as a phone), wherein the tag reader 225 is configured to capture data from the tag 230 to detect the presence of the user 115 within the pathway 110. In some embodiments, the tag 230 may also be worn or attached to the mobile hazard 105 (e.g., a cat or dog), such as via a microchip implanted in the cat or dog, or a collar or other accessory worn by the cat or dog to detect the position of the mobile hazard 105 via the tag 230. The pathway 110 may include a plurality of tag readers 225 arranged at various positions on the pathway 110 to detect the presence and position of the user 115 and the mobile hazard 105 at any point within the pathway 110.

Preferably, the tag 230 includes identification and other information for its wearer/carrier. For example, the tag 230 carried by the user 115 may include some or all of the following information: (a) the name of the user 115; (b) physical issues or injuries that may impair the user's 115 ability to walk, such as the user's 115 impaired vision, blindness, leg injury, age, etc.; and (c) preferences regarding preferred warning signals, such as auditory, visual, spoken commands, etc. Similarly, the tag 230 carried by the mobile hazard 105 may include the same or similar information, for example: (a) the name of the mobile hazard 105 (e.g., a cat or dog); (b) physical issues or injuries that may impair the mobile hazard's 105 movement, such as impaired vision, blindness, injury, age, etc.; and (c) preferences regarding preferred distraction signals, such as auditory, visual, spoken commands (as discussed below with reference to FIG. 8).

The tag 230 and tag reader 225 may be any one of a variety of suitable devices. For example, in one embodiment, the tag 230 may be a beacon emitting radiation and the tag reader 225 may be a detector for the radiation. The radiation may comprise at least one of ultrasonic radiation, radio frequency radiation, infrared radiation, visible radiation, or ultraviolet radiation. In some embodiments, the tag 230 may be an RFID tag, such as an active RFID tag, and the tag reader 225 may be an RFID reader. The RFID tag may be an active or passive RFID tag, and the RFID reader may be an active or passive RFID reader. Preferably, the RFID reader has a reception range overlapping the pathway 110.

In one embodiment, the RFID tag 230 may be an active RFID tag 230 and the tag reader 225 may be a passive RFID reader 225 configured to receive a signal from the active RFID tag 230. In other embodiments, the RFID tag 230 may instead be a passive RFID tag 230 and the RFID reader 225 may instead be an active RFID reader 225 configured to transmit interrogatory signals and receive data from the passive RFID tag. In yet other embodiments, RFID tag 230 is an active RFID tag 230 and the tag reader 225 is an active reader 225 configured to transmit interrogatory signals, wherein the RFID tag 230 is activated in response to receiving the interrogatory signal.

In some embodiments, the RFID reader 230 may have a fixed interrogatory zone overlapping the pathway 110, where the RFID reader 230 is configured to transmit interrogatory signals within the interrogatory zone and receive data from the RFID tag 225 when the RFID tag 225 is positioned within the interrogatory zone. In such embodiments, RFID tags 225 may be carried by both the human user 115 and the mobile hazard 105, and the sensor system 120 may generate the sensor signal in response to the RFID reader 230 receiving signals from the RFID tags 230 indicating that both the human user 115 and the mobile hazard 105 are positioned within the interrogatory zone. As described previously, the data capture from the RFID reader 230 may include at least one of identification information of the mobile hazard 105 or positioning information of the mobile hazard 105 within the pathway 110, or both. For example, the data from the RFID tag 225 may identify at least one step of the plurality of steps at which the mobile hazard 105 is located, where such information may be communicated to the user 115 via the reporting system 180.

In some embodiments, the illumination system 215 (see FIG. 1) may be in communication with one or both of the tagging system (tag reader 225 and tag 230) and the reporting system 180, where the illumination system 215 may be activated to illuminate the mobile hazard 105 within the pathway 110 in response to the tagging system detecting both the human user 115 and the mobile hazard 105 within the pathway 110. As described previously, the illumination system 215 may illuminate the mobile hazard 105 based on the position information of the mobile hazard 105 within the pathway.

In other embodiments, the tag 230 and the illumination system 215 (e.g., an LED or other light source) may both be attached or built-in to the collar of the mobile hazard (animal) 105. In such embodiments, the illumination system 215 may be activated to illuminate the collar of the mobile hazard 105 in response to the tagging system detecting the animal 105 within the pathway. With the collar illuminated, the user 115 may be able to locate and identify the mobile hazard 105 quickly.

Figure 8:
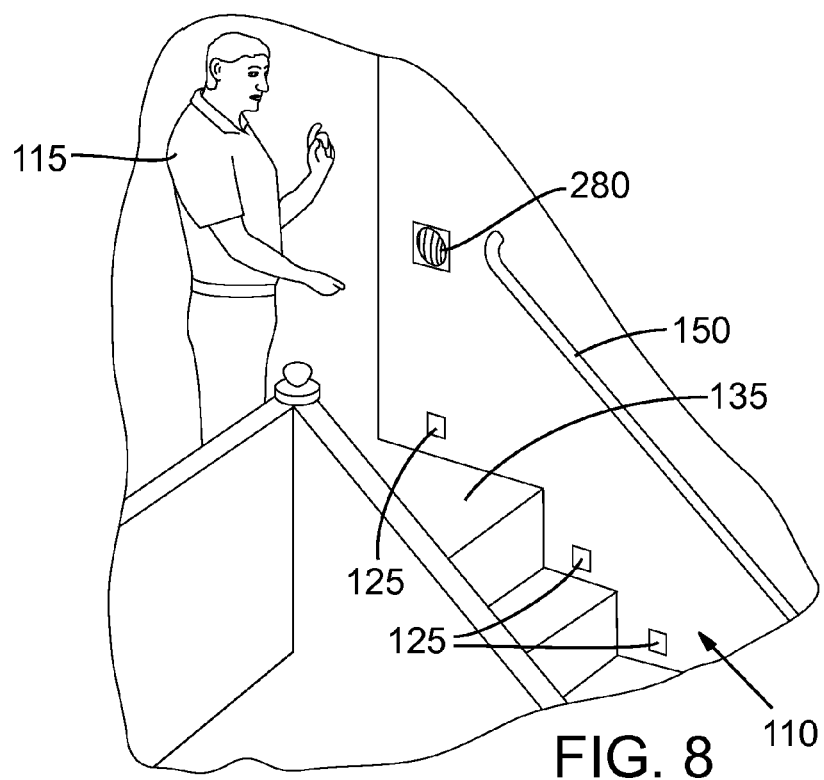
FIG. 8 is a partial cut-away view of the pathway illustrating a distraction system according to one embodiment.

FIG. 8 is a partial cut-away view of the pathway 110 illustrating a distraction system 280 in communication with the sensor system 120 and configured to generate a distraction to urge movement of the mobile hazard 105 away from at least one of the pathway 110 or the human user 115 in response to receiving the sensor signal from the sensor system 120 indicating the concurrent presence of the user 115 and the mobile hazard 105 in the pathway 110. In embodiments where the mobile hazard 105 is an animal (e.g., a cat or a dog), the distraction system 280 may be useful to distract the cat, dog, or other animal, such as by generating an audible or ultrasonic sound to scare the animal away. In other embodiments, the distraction system 280 may generate a visual signal or indicator, such as a beam of light, to encourage the mobile hazard 105 (e.g., a cat) to chase the light off the pathway 110.

In some embodiments, the distraction system 280 may be in communication with (or part of) the reporting system 180, where the reporting system 180 generates a distraction signal and transmits the distraction signal to the distraction system 280. Upon receiving the distraction signal, the distraction system 280 generates a distraction to urge movement of the mobile hazard 105 away from the pathway 110 and/or from the human user 115. In such embodiments, once the distraction system 280 has successfully distracted the mobile hazard 105 so that it is off the pathway 110, the distraction system 280 may send a signal to the reporting system 180 to alert the user that the pathway 110 is clear.

In other embodiments, the distraction system 280 may be attached to or built-in to a collar or other accessory worn by the mobile hazard (or animal) 105. In such embodiments, the distraction system 280 may be a sound or vibration that scares the animal 105 so that the animal 105 runs away and off the pathway 110. As the animal 105 runs away, the mobile hazard positioning system 155, the sensor system 120, the camera system 300, the tagging system, or a combination of these systems may track the animal 105 to determine its movement direction along the pathway 110 and determine whether the animal 105 has left the pathway 110. As described previously, the reporting system 180 may alert the user 115 that the mobile hazard 105 has cleared the pathway 110.

Figure 9:
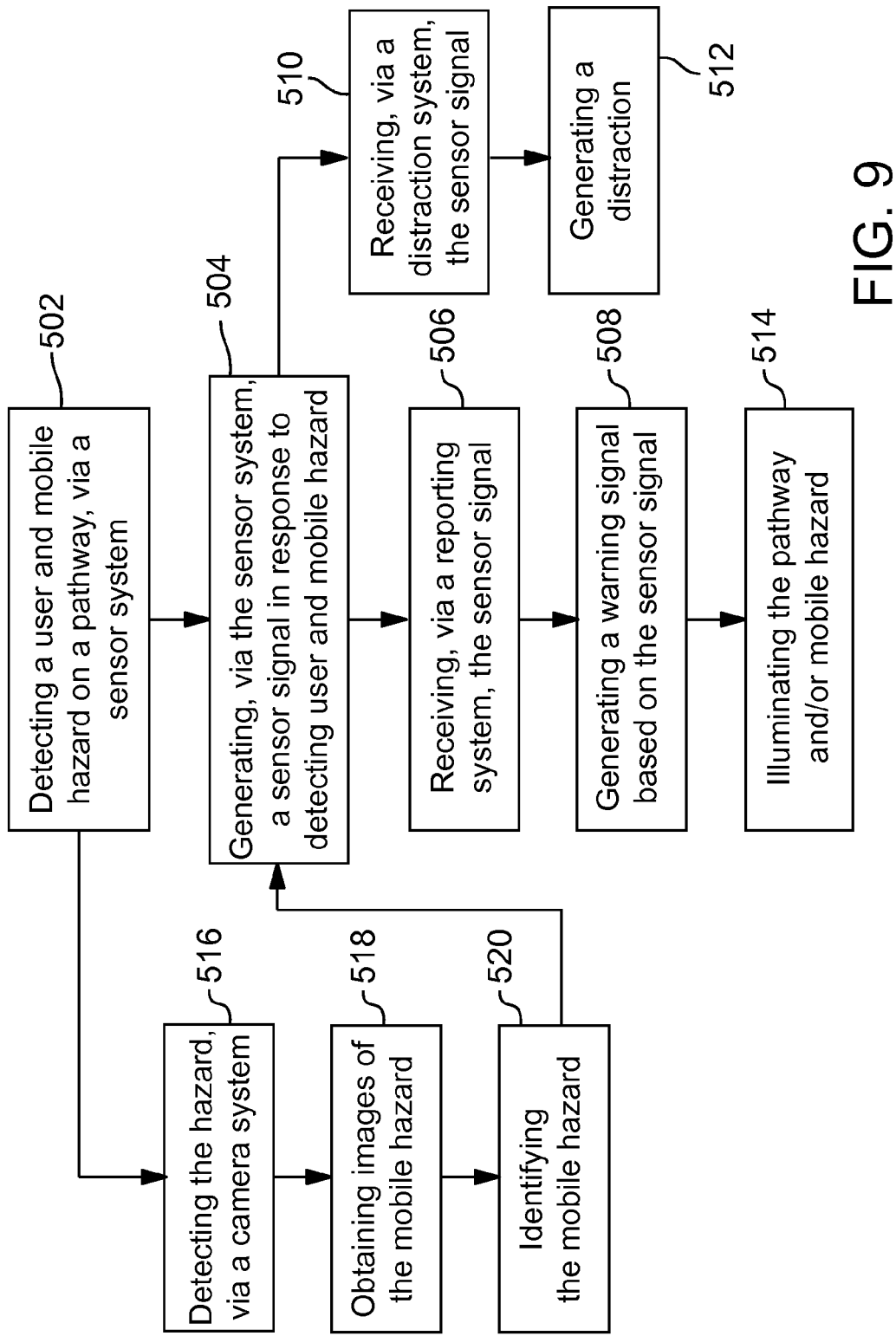
FIG. 9 is a block diagram illustrating a method for detecting a mobile hazard on a pathway, according to one embodiment.

FIG. 9 is a block diagram illustrating a method for monitoring a mobile hazard on a pathway to avoid collisions between a human user and the mobile hazard. It should be understood that the method described below is for illustration purposes and the order in which the steps are described is not meant to be limiting. It should be understood that in other embodiments, the steps may occur in a different order.

With particular reference to FIG. 9, at step 502, the sensor system detects a concurrent presence of a human user and a mobile hazard within a monitoring zone of the sensor system. In some embodiments, the sensor system may also detect positional information of the user relative to the mobile hazard, where the positional information may include the step at which the user resides, or whether the user is going up the stairs or down the stairs. The first sensor system may also determine motion information of the user and the mobile hazard (e.g., whether the user or mobile hazard is moving or standing still and/or the speed of the user's or mobile hazard's movement). In some embodiments, one or both of the positional information and motion information may be determined by communication of the sensor system with an electronic device (such as a mobile phone) having a position determination system (e.g., GPS), where the electronic device is carried by the user and/or the mobile hazard.

At step 504, the sensor system generates a sensor signal in response to detecting the concurrent presence of the human user and the mobile hazard within the monitoring zone. In some embodiments, the sensor signal may be generated based on a proximity threshold of the mobile hazard relative to the user. For example, if the mobile hazard is not within a defined proximity relative to the position of the human user (i.e., the mobile hazard is not close to the user), the sensor signal may not be generated. Once the user and or the mobile hazard move closer toward each other, the sensor signal may be generated. In some embodiments, the sensor signal may be generated based on relative motion of the mobile hazard relative to the user. For example, if the mobile hazard and the human user are moving away from each other, the sensor signal may not be generated.

At step 506, the sensor signal from the sensor system is received by a reporting system in communication with the sensor system. At step 508, the reporting system generates a warning signal based on the sensor signal from the sensor system, the warning signal communicating to the user information relating to the presence of the mobile hazard within the monitoring zone. The warning signal may include information about the mobile hazard, such as the identity of the mobile hazard, an image of the mobile hazard, and/or a precise location of the mobile hazard on the pathway. In some embodiments, the reporting system may also communicate position information of the mobile hazard to the user, such as whether the mobile hazard is in front of or behind the user's current position, or whether the mobile hazard is moving or stationary. When the user receives the warning signal, the user may thereafter identify the mobile hazard, identify a location of the mobile hazard, and select a path along the pathway to safely avoid the mobile hazard.

In some embodiments, the sensor signal (or warning signal) or both may also be received by a distraction system at step 510. Upon receiving the sensor signal, at step 512, the distraction system generates a distraction to urge movement of the mobile hazard away from at least one of the pathway or the human user in response to receiving the sensor signal from the sensor system. In some embodiments, the distraction includes at least one of a visual signal perceived by the mobile hazard, an audible signal heard by the mobile hazard, an ultrasonic signal heard by the mobile hazard, or a vibratory signal felt by the mobile hazard. In other embodiments, the warning signal may be communicated to an output device attached to or carried by the user.

In some embodiments, at step 514, an illumination system may illuminate the detected mobile hazard(s) so that the user can identify the mobile hazard(s) on the pathway. For example, the illumination system may include a plurality of LEDs or other light sources arranged at various locations of the pathway so that each of the LEDs illuminates individual regions or steps of the pathway. When the mobile hazard(s) are located by the sensor system, the illumination system may activate particular LEDs to illuminate the locations at which the mobile hazard(s) is present. In other embodiments, the illumination system may be an overhead system that illuminates all or substantially all of the pathway to allow the user to locate the mobile hazard(s).

In some embodiments, the sensor system may include a camera system in communication therewith. At step 516, the camera system detects movement of the human user and/or the moving hazard within the pathway. At step 518, the camera system obtains one or more images of the moving hazard and processes the images to identify the moving hazard at step 520. In some embodiments, the camera system may include a database having a plurality of images stored therein, where an image processor may compare the obtain images of the moving hazard with the stored images to identify the moving hazard as described previously. Once the moving hazard is identified, the sensor system may include this information in the sensor signal that is received by the reporting system. At step 508, generating the warning signal may include communicating or displaying the images and/or identity of the moving hazard to the user.

Other embodiments are possible. Although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A safety system for avoiding collisions with mobile hazards on a pathway, the system comprising:
a sensor system configured to monitor a pathway, the sensor system configured to detect a concurrent presence of a human user and a mobile hazard within a monitoring zone, the sensor system further configured to generate a sensor signal in response to detection of the concurrent presence of the human user and the mobile hazard within the monitoring zone; and
a reporting system in communication with the sensor system, the reporting system configured to receive the sensor signal and generate a warning signal to alert the human user to the concurrent presence of the mobile hazard within the monitoring zone.

2. The system of claim 1, wherein the sensor system includes a first sensor subsystem positioned at a first end of the pathway and a second sensor subsystem positioned at a second end of the pathway, wherein the pathway spans between the first and second sensor subsystems.

3. The system of claim 2, wherein the first and second sensor subsystems each include a light curtain having one or more light beams traversing a portion of the pathway to detect the concurrent presence of the human user and the mobile hazard within pathway.

4. The system of claim 1, wherein the reporting system is configured to generate the warning signal based on proximity of the mobile hazard to the human user.

5. The system of claim 1, wherein the reporting system is configured to deliver the warning signal to an output device attached to the mobile hazard.

6. The system of claim 1, wherein the reporting system comprises an output device for the warning signal, the output device configured to be carried by the human user.

7. The system of claim 1, wherein the warning signal includes one or both of a visual alarm perceived by the human user and an audible signal heard by the human user.

8. The system of claim 1, further comprising a distraction system in communication with the reporting system, wherein the reporting system is further configured to generate a distraction signal and transmit the distraction signal to the distraction system, the distraction system generating a distraction to urge movement of the mobile hazard away from at least one of the pathway or the human user in response to receiving the distraction signal from the reporting system.

9. The system of claim 1, wherein the pathway includes a staircase having a top step at a first end of the staircase, a bottom step at a second end of the staircase, and one or more steps spanning between the top and bottom steps, and wherein the sensor system includes a first sensor subsystem positioned proximal to the top step and a second sensor subsystem positioned proximal the bottom step.

10. The system of claim 1, further comprising a mobile hazard positioning system for monitoring a position of the mobile hazard within the pathway, and wherein the mobile hazard positioning system is in communication with one or both of the sensor system and the reporting system, the mobile hazard monitoring system configured to generate a signal to communicate position information of at least one of the mobile hazard or the human user in response to the sensor system detecting at least one of the mobile hazard or the human user within the pathway.

11. The system of claim 1, further comprising a mobile hazard positioning system for monitoring a position of the mobile hazard within the pathway, and wherein the mobile hazard positioning system includes one or more sensors, each sensor located at a position along the pathway, and wherein each sensor has a corresponding sensor field for which the sensor is configured to detect at least one of the mobile hazard when the mobile hazard is located within the sensor field or the human user when the human user is located within the sensor field.

12. The system of claim 11, wherein the pathway includes a staircase having a plurality of steps, and the position information identifies at least one step of the plurality of steps at which the mobile hazard is located.

13. The system of claim 1, the sensor system comprising a tagging system including a tag and a tag reader, the tag carried by one or both of the human user and the mobile hazard, wherein the tag reader is configured to capture data from the tag to detect the presence of at least one of a human user or a mobile hazard within the pathway.

14. The system of claim 13, wherein the mobile hazard is an animal and the tag is carried by an article worn by the animal.

15. The system of claim 14, wherein the data captured from the tag includes at least one of identification information of the animal or positioning information of the animal within the pathway.

16. The system of claim 13, wherein the tag is carried by an article of clothing worn by the human user.

17. The system of claim 13, further comprising an illumination system in communication with one or both of the tagging system and the reporting system, wherein the illumination system is activated to illuminate the mobile hazard within the pathway in response to the tagging system detecting both the human user and the mobile hazard within the pathway, wherein the pathway includes a staircase having a plurality of steps, and wherein the illumination system includes a plurality of individual illumination sources, and wherein each step of the plurality of steps in the staircase includes an individual illumination source of the plurality of individual illumination sources.

18. The system of claim 1, further comprising an illumination system in communication with one or both of the sensor system and the reporting system, wherein the illumination system is activated to illuminate the mobile hazard within the pathway in response to the sensor system detecting both the human user and the mobile hazard within the pathway.

19. The system of claim 18, wherein the pathway includes a staircase having a plurality of steps, and wherein the illumination system includes a plurality of individual illumination sources, and wherein each step of the plurality of steps in the staircase includes an individual illumination source of the plurality of individual illumination sources.

20. The system of claim 1, wherein the pathway is a staircase with a plurality of steps and a handrail, and wherein at least a portion of the sensor system is attached to the handrail.

21. The system of claim 20, wherein the sensor system is activated in response to the human user contacting the handrail, and deactivated in response to the human user releasing contact of the handrail.

22. A method for monitoring a mobile hazard on a pathway to avoid collisions between a human user and the mobile hazard, the method comprising:
  detecting, via a sensor system, a concurrent presence of a human user and a mobile hazard within a monitoring zone of the sensor system;
  generating, via the sensor system, a sensor signal in response to detecting the concurrent presence of the human user and the mobile hazard within the monitoring zone;
  receiving, via a reporting system, the sensor signal from the sensor system; and
  generating, via the reporting system, a warning signal based on the sensor signal from the sensor system, the warning signal communicating to the user information relating to the presence of the mobile hazard within the monitoring zone.

23. The method of claim 22, wherein the sensor system includes a first sensor subsystem positioned at a first end of the pathway and a second sensor subsystem positioned at a second end of the pathway, wherein the pathway spans between the first and second sensor subsystems.

24. The method of claim 23, wherein the first and second sensor subsystems each include a light curtain having one or more light beams traversing a portion of the pathway to detect the concurrent presence of the human user and the mobile hazard within pathway.

25. The method of claim 22, further comprising generating, via the reporting system, the warning signal based on proximity of the mobile hazard to the human user.

26. The method of claim 22, further comprising delivering, via the reporting system, the warning signal to an output device attached to the mobile hazard.

27. The method of claim 22, wherein the reporting system comprises an output device for the warning signal, the output device configured to be carried by the human user.

28. The method of claim 22, wherein the warning signal includes one or both of a visual alarm perceived by the human user and an audible signal heard by the human user.

29. The method of claim 22, further comprising:
  generating, via the reporting system, a distraction signal;
  transmitting, via the reporting system, the distraction signal to a distraction system; and
  in response to receiving the distraction signal, generating, via the distraction system, a distraction to urge movement of the mobile hazard away from at least one of the pathway or the human user.

30. The method of claim 22, wherein the pathway includes a staircase having a top step at a first end of the staircase, a bottom step at a second end of the staircase, and one or more steps spanning between the top and bottom steps, and wherein the sensor system includes a first sensor subsystem positioned proximal to the top step and a second sensor subsystem positioned proximal the bottom step.

31. The method of claim 22, further comprising monitoring, via a mobile hazard positioning system, a position of the mobile hazard within the pathway, and communicating to the user, via the reporting system, position information related to the position of the mobile hazard relative to a position of the human user.

32. The method of claim 22, further comprising monitoring, via a mobile hazard positioning system, a position of the mobile hazard within the pathway, and generating a signal, via the mobile hazard positioning system, to communicate the position of at least one of the mobile hazard or the human user in response to the sensor system detecting the mobile hazard or the human user within the pathway.

33. The method of claim 32, wherein the pathway includes a staircase having a plurality of steps, and the position information identifies at least one step of the plurality of steps at which the mobile hazard is located.

34. The method of claim 22, the sensor system comprising a tagging system including a tag and a tag reader, the tag carried by one or both of the human user and the mobile hazard, the method further comprising capturing data from the tag, via the tag reader, to detect the presence of at least one of the human user or a mobile hazard within the pathway.

35. The method of claim 34, wherein the mobile hazard is an animal and the tag is carried by an article worn by the animal.

36. The system of claim 35, wherein the data captured from the tag includes at least one of identification information of the animal or positioning information of the animal within the pathway.

37. The method of claim 34, wherein the tag is carried by an article of clothing worn by the human user.

38. The method of claim 34, further comprising illuminating, via an illumination system, the mobile hazard within the pathway in response to the tagging system detecting both the human user and the mobile hazard within the pathway, wherein the pathway includes a staircase having a plurality of steps, and wherein the illumination system includes a plurality of individual illumination sources, and wherein each step of the plurality of steps in the staircase includes an individual illumination source of the plurality of individual illumination sources.

39. The method of claim 22, further comprising illuminating, via an illumination system, the mobile hazard within the pathway in response to the sensor system detecting both the human user and the mobile hazard within the pathway.

40. The method of claim 39, wherein the pathway includes a staircase having a plurality of steps, and wherein the illumination system includes a plurality of individual illumination sources, and wherein each step of the plurality of steps in the staircase includes an individual illumination source of the plurality of individual illumination sources.

41. The method of claim 22, wherein the pathway is a staircase with a plurality of steps and a handrail, and wherein at least a portion of the sensor system is attached to the handrail.

42. The method of claim 41, further comprising activating the sensor system in response to the human user contacting the handrail, and deactivating the sensor system in response to the human user releasing contact of the handrail.

* * * * *